Patented Oct. 27, 1931

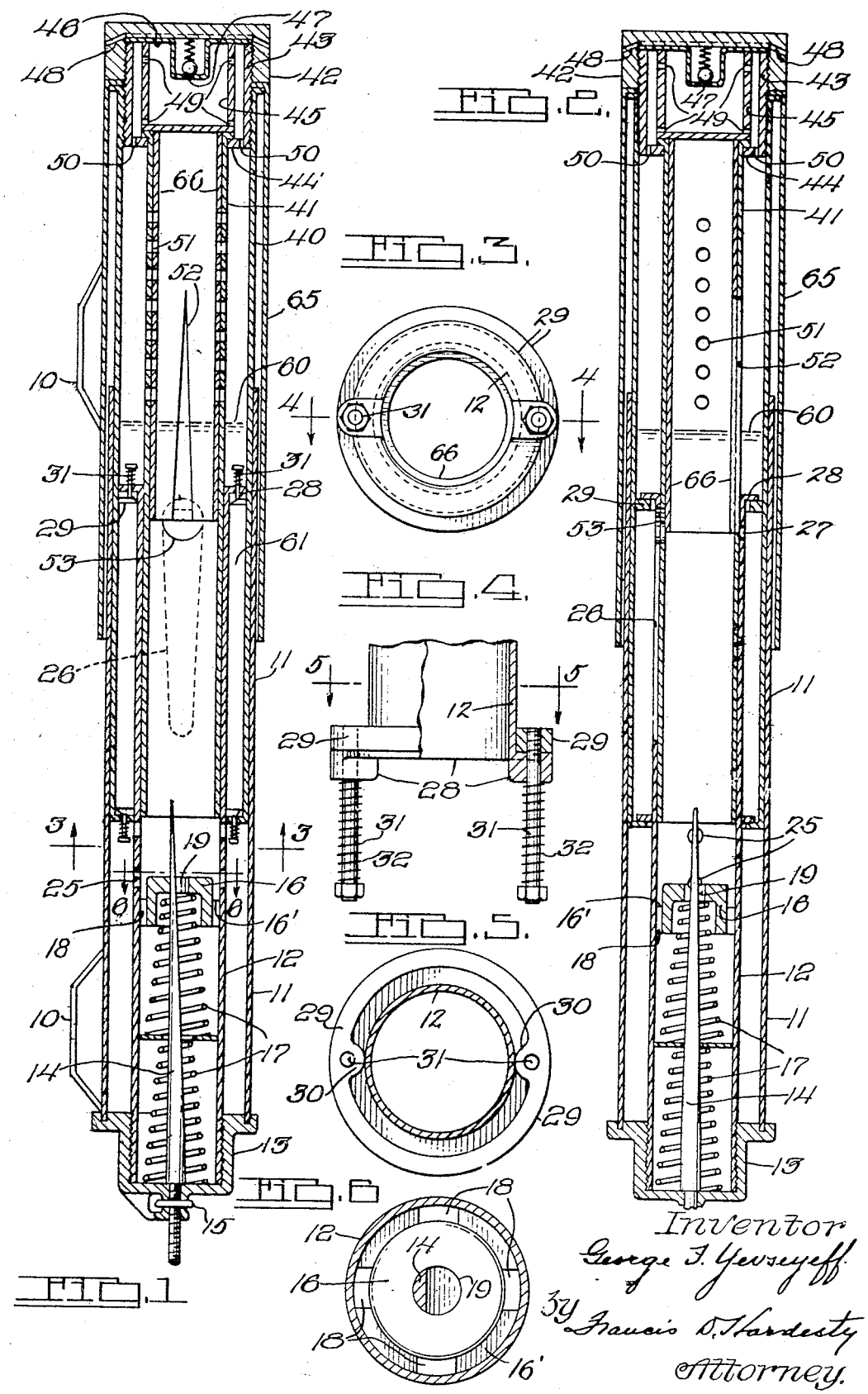

1,829,382

UNITED STATES PATENT OFFICE

GEORGE F. YEVSEYEFF, OF DETROIT, MICHIGAN

SHOCK ABSORBER

Application filed May 13, 1929. Serial No. 362,467.

The present invention relates to shock absorbers for vehicles or rather to means for modifying the spring action.

Among the objects of the invention is to provide means for controlling the spring action and to automatically vary such control according to spring position.

Another object is a shock absorber of the hydraulic type which exercises the control through transfer of liquid from one part to another and controls such transfer.

Still other objects will readily occur to those skilled in the art upon reference to the following description and the accompanying drawings in which, Fig. 1 is a vertical section through the device;

Fig. 2 is another vertical section taken at right angles to the plane of Fig. 1.

Fig. 3 is a section on line 3—3 of Fig. 1;

Fig. 4 is a section on line 4—4 of Fig. 3;

Fig. 5 is a section on line 5—5 of Fig. 4, and,

Fig. 6 is a section on line 6—6 of Fig. 1.

As indicated in the drawings, the device consists of two pairs of concentric telescoping tubes, each pair being connected to one of the relatively moving parts of the vehicle such as the frame and the axle by means of suitable brackets (not shown) which may be secured to the device by means of the lateral extensions 10.

The lower pair of tubes is indicated at 11 and 12, with the tube 12 of somewhat smaller diameter than the tube 11 and located within the latter and spaced therefrom. These two tubes 11 and 12 are shown as secured to a suitable cap member 13 by means of which the lower ends of both tubes are closed liquid tight and in such fashion as to withstand considerable internal pressure. Extending up from the central point of the cap 13, within the tube 12, is a tapered member 14 which is provided, as at 15, with means for adjusting its vertical position. Also located within tube 12 is a plunger 16 supported upon springs 17 which are preferably conical as shown, in order that when collapsed they may occupy a very small space. This plunger 16 is shown in plan in Fig. 6 and is shown as having a shoulder 16' slotted as at 18 to permit passage of liquid around the plunger. The central portion of the plunger has an opening 19 through which extends the member 14.

Tube 12 extends to near the top of tube 11 and is provided with perforations 25, of which there are several at about the upper end of travel of the plunger 16. This tube 12 is also provided near its top with a large tapering opening 26 in one side and a small rectangular opening 27 diametrically opposite thereto, and opposite the upper end of the opening 26. This tube 12 is also provided with an outwardly extending flange 28 which coacts with a ring member 29 to form a valve shown in somewhat larger scale in Figs. 3, 4, and 5.

In the latter figures the valve shown is the valve carried by the lower end of one of the upper tubes but the construction of both is identical. In Figs. 3, 4, and 5, the tube flange is indicated at 28 with the valve itself in the form of a ring 29 having ear portions 30 into which are secured the guide bolts 31 which extend through the flanges 28 and are provided with springs 32 tending to hold the valve on its seat. These valve rings 29 likewise serve to maintain the tubes 11, 12 in concentric relation, as the rings 29 cooperate with the adjacent tube and slide therein.

The upper pair of tubes 40 and 41 are of sufficiently smaller diameter than the tubes 11 and 12 respectively to have a sliding fit therein and are both secured to the head of the device in liquid tight manner. This head consists of a cap 42 having a sleeve 43 fixed therein, to which sleeve is secured the tube 40. The sleeve 43 is provided with an inwardly extending flange 44 serving as a support for a corresponding flange on the tube 41. Within the sleeve 43 and spaced therefrom is a cup member 45 closed at its bottom and fixed tightly against the top of the cap 42 with a valve cage 46 interposed therebetween. This valve cage 46 may consist of a small sheet metal member with the valve cup drawn down at its central portion and provided with a port in its bottom to coact with the ball 47.

Suitable provisions will be made to allow a passage way from the interior of the cup 45 to the lateral ports 48 opening to the outside air through the cap member 42. The cup 45 will also be provided with ports 49 opening into the space between the member 45 and the sleeve 43, and flange 44 will be provided with suitable openings 50 allowing communication to the same space from between the tube 40 and the tube 41. This arrangement of parts prevents escape of liquid with the outgoing air.

The tube 41 is provided with openings 51, of which there are quite a number, and is also provided with a tapering slot 52 tapering from the lower end towards the top. When the tubes 11, 12, 40, and 41 are telescoped to about the middle of their total movement, the lower end of the slot 52 will register with the small rectangular opening 27 in the tube 12. This tube 41 is also provided with a circular opening 53 adapted to register with the opening 26 in the tube 12. This tube 41 extends down within the tube 12.

Tube 40 is adapted to telescope into tube 11 and is provided at its lower end with a valve 29 similar to the one provided on tube 12, but acting in the opposite direction, the two valves 29 controlling the direct passage of liquid to and from the space 61 between tubes 40 and 12.

This device is intended to be filled with a suitable liquid, not greatly affected by heat or cold, up to about the level indicated at 60, and when the tubes 11, 12, 40 and 41 are telescoped together, the chamber 61 between the two spring operated valves on tubes 40 and 12 tends to become larger while the chambers above and below said valves tend to become smaller. Liquid, therefore, must be transferred from above and below into the chamber 61. Both of the valves 29 mentioned open towards said chamber 61 and consequently the transfer readily takes place through these valves. When, however, the tubes 11, 12, 40, and 41 are withdrawn and the chamber 61 tends to become smaller, the liquid must pass through the openings 26 and 53, or 27 and 52, in order to get within the central chamber within the tube 41 and from thence through the openings 25 and 51 into the outer annular chamber.

By so tapering the openings 26 and 52 and so locating the openings 53 and 27, this flow can be controlled in any desired manner, and to give any desired action.

In order to prevent the complete telescoping of the tubes, the plunger 16 is provided in the lower end of tube 12 and so arranged that as the end of tube 41 descends, it seats itself on the shoulder 16' of the plunger 16 and closes the slots 18 so that any liquid below the plunger 16 must pass through the opening 19. As the plunger 16 is forced down towards the end of the tube, the tapered member 14 gradually closes the opening 19 and retards the downward movement.

On the return trip, however, the passage of liquid to below the plunger 16 is quite slow through the opening 19 but the slots 18 will be opened due to the tube 41 drawing away from the plunger and the latter will return to its upper position rather promptly.

This, in addition to the springs 17, provides the cushioning as the tubes 11, 12, 40, and 41 become more and more telescoped, and finally the point is reached where the opening 19 is substantially completely closed and before the plunger 16 strikes the bottom cap 13.

The valve 47 in the tube cap is provided to reduce the air content of the device so that the air which is above the liquid level 60 will not interfere with the operation of the device. When the tubes 11, 12, 40, and 41 begin to collapse, the air will be forced out through the valve 47 and when the tubes are withdrawn, the air will not be allowed to return due to the valve 47. This very low air pressure in the upper end of the device materially assists in the cushioning effect of the device as a whole.

The outer tube 65 serves as a shield against collection of dirt, etc., on the surface of tubes 40 and 11 and also as a support for the upper lateral extension 10. The inner tube 66 within tube 41 may be utilized to adjust the size of the openings 51 and 52. It will, of course, be rotated relative to tube 41 to change the latter.

Now, having described the invention and the preferred forms of embodiment thereof, it is to be understood that the said invention is to be limited, not to the specific details herein described and illustrated, but only by the scope of the claims which follow.

I claim:—

1. A shock absorber comprising a pair of concentric tubes spaced apart and closed at one end, a second pair of spaced concentric tubes closed at one end and adapted to be telescoped into the first pair with the members of the second pair fitting closely within the corresponding members of the first pair, a valve carried by the free end of the outer member of the second pair, a second valve carried by the free end of the inner member of the first pair, said valves adapted to permit inflow of fluid to the space between said valves from above and below said space, variable openings in said inner tube members adapted to register to permit flow from said space into said inner tubes, there being other openings to permit passage of fluid from said inner tubes into the spaces between the outer tubes above and below said valves, and a body of liquid in said device with its level below the top of the outer member of said first pair.

2. In a shock absorber adapted to control spring action by transfer of liquid and to control such transfer, a chamber adapted to be varied in content by spring action, opposedly-acting means permitting free access of liquid to said chamber and means controlling outflow of liquid from said chamber in accordance with the position of the parts which vary the chamber content.

3. In a shock absorber, a pair of concentric spaced tubes fixed together at the lower end and sealed against liquid passage, a second pair of concentric spaced tubes adapted to telescope into the first pair and fixed together with a closure at their upper ends, said tubes when telescoped forming a central chamber and an annular chamber, valved means dividing said annular chamber into an upper, a lower, and an intermediate chamber with said valves opening into the latter, the inner member of the first pair of tubes having a tapered opening opposite said intermediate chamber and a diametrically located second opening, the inner member of the second pair of tubes having an opening adapted to register with said tapered opening and also a tapered slot adapted to register with said second opening, said tapered slot affording communication between the central chamber and said upper chamber, said registering openings serving to control flow of liquid from said intermediate chamber to said central chamber.

4. In a shock absorber adapted to control spring action by transfer of liquid from a main portion by way of an annular subdivision thereof, a body of liquid insufficient to completely fill said device, and means to exhaust the air from the space above said liquid.

5. In a shock absorber adapted to control spring action by transfer of liquid from a main portion by way of an annular subdivision thereof, a body of liquid insufficient to completely fill said device, means to exhaust the air from the space above said liquid, and means for separating entrained liquid from outgoing air.

6. In a shock absorber comprising telescoping tubes containing a body of liquid, means for preventing the inner tube from striking the bottom of the outer tube, comprising a plunger supported upon aligned elements adapted for compact collapse and having an axial opening therein, said plunger being adapted to be pressed down by the inner tube, and means for gradually closing said opening as said plunger is depressed.

7. In a shock absorber comprising telescoping tubes containing a body of fluid, means for preventing the inner tube from striking the bottom of the outer tube, comprising a plunger having an opening therein and adapted to be pressed down by said inner tube, and means for gradually closing said opening as said plunger is depressed, said plunger also being provided with an opening adapted to be closed by said inner tube during downward movement and allowed to open during upward movement.

GEORGE F. YEVSEYEFF.